United States Patent [19]

Parks et al.

[11] Patent Number: 5,450,191
[45] Date of Patent: Sep. 12, 1995

[54] METHOD FOR TESTING OPTICAL WAVEGUIDE FIBERS TO DETECT REFLECTION TYPE DISCONTINUITIES

[75] Inventors: Thomas W. Parks, Ithaca; Annette L. Vandervort, Corning, both of N.Y.

[73] Assignee: Corning Incorporated, Corning, N.Y.

[21] Appl. No.: 59,156

[22] Filed: May 6, 1993

[51] Int. Cl.$^6$ ............................................. G01N 21/88
[52] U.S. Cl. .................................................... 356/73.1
[58] Field of Search ........................................ 356/73.1

[56] References Cited

U.S. PATENT DOCUMENTS 4,963,020 10/1990 Luthra et al. ...................... 356/73.1
5,066,118 11/1991 Buerli ................................. 356/73.1

OTHER PUBLICATIONS

John Karl, *An Introduction to Digital Signal Processing*, Academic Press, 1989, pp. 217–225.
Harry L. Van Trees, *Detection, Estimation, and Modulation Theory*, Part I, John Wiley & Sons, 1968, pp. 246–253.

*Primary Examiner*—Vincent P. McGraw
*Attorney, Agent, or Firm*—Maurice M. Klee; Jay M. Brown

[57] ABSTRACT

A method for detecting reflection-type discontinuities in an optical waveguide fiber, such as those produced by a fiber break, a contaminant in the glass making up the fiber, a microbend, or a mechanical splice or connector, is provided. The method employs an optical time domain reflectometer (OTDR) and involves cross-correlating an OTDR trace or a modified OTDR trace, e.g., one from which fiber attenuation has been subtracted, with a predetermined waveform which is characteristic of a reflection-type discontinuity. The predetermined waveform can compensate for differences between the noise spectrum of the OTDR trace and white noise. In particular, a predetermined waveform obtained by backward differencing and then forwarding differencing an average of waveforms known to correspond to reflection-type discontinuities is able to provide such white noise compensation.

18 Claims, 6 Drawing Sheets

METHOD FOR TESTING OPTICAL WAVEGUIDE FIBERS TO DETECT REFLECTION TYPE DISCONTINUITIES

BACKGROUND OF THE INVENTION

1. Field of the Invention

This invention relates to optical waveguide fibers and, in particular, to methods and apparatus for testing such fibers for reflection-type discontinuities.

2. Description of the Prior Art

Optical waveguide fibers are often tested by means of an optical time-domain reflectometer (OTDR). This device sends a short pulse of laser light down a fiber and observes the small fraction of light which is scattered back towards the source. Typical pulsewidths may range from 0.5 meters (5 ns) to 2000 meters (20 μs).

In practice, the fiber under test is connected to the OTDR by a relatively short length of fiber (e.g., a one kilometer length of fiber) known in the art as a "pigtail." The pigtail reduces the deadzone (non-linear region) at the start of the fiber where the OTDR does not provide reliable information. To further improve performance, an index matching oil can be used at the junction between the pigtail and the fiber.

Figure 1:
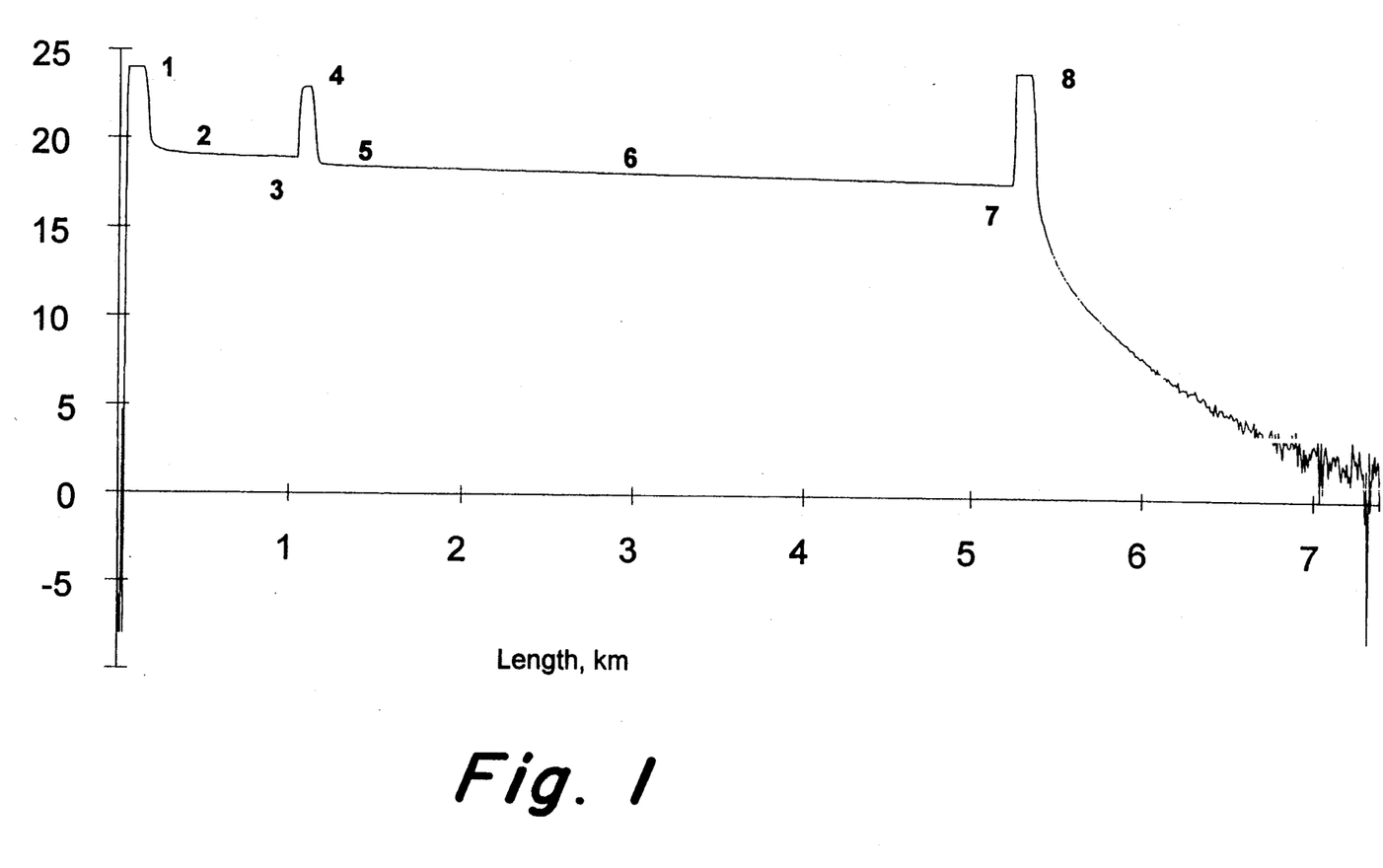
FIG. 1 shows a typical trace produced by an OTDR.

A typical OTDR trace is shown in FIG. 1 where returned power in dBs is plotted along the y-axis and distance down the fiber is plotted along the x-axis. Various features of this trace are identified by the reference numbers 1 through 9 where the number 1 shows the reflection which occurs at the junction between the OTDR and the pigtail, the number 2 shows the trace obtained from the pigtail, the number 3 shows the last point of the pigtail and the first point of fiber under test, the number 4 shows the reflection and associated deadzone produced by the junction between the pigtail and test fiber, the number 5 shows the first point after the near-end deadzone at which trace information can be examined reliably (referred to herein as the "fiber start" or the "FS"; note that the fiber start does not correspond to the physical end of the fiber but rather to the first point from which reliable data can be obtained), the number 6 shows the fiber trace between FS and the physical end of the fiber (referred to herein as the "fiber end" or "FE"), the number 7 shows the FE, the number 8 shows the reflection which occurs at the FE, and the number 9 shows the inherent noise level of the OTDR.

Among other things, the OTDR trace is used to identify the location and magnitude of "point defects" and unexpected "reflections," i.e., reflections other than those expected at the junctions between the OTDR and the pigtail and the pigtail and the test fiber and that produced by the end of the fiber. Point defects comprise downward deviations in the OTDR trace that occur over approximately one pulsewidth. They correspond to inclusions, point discontinuities, fusion splices, and microbends in the glass making up the fiber.

Reflections comprise upward deviations or "spikes" in the OTDR trace, occurring when a point scattering site in the fiber reflects excess power back to the OTDR. They correspond to fiber breaks, contaminants in the glass making up the fiber, microbends, mechanical splices or connectors, and the like (referred to generally herein as "reflection-type discontinuities"). Reflections are typically, but not always, associated with a point defect at the same location.

Figure 2:
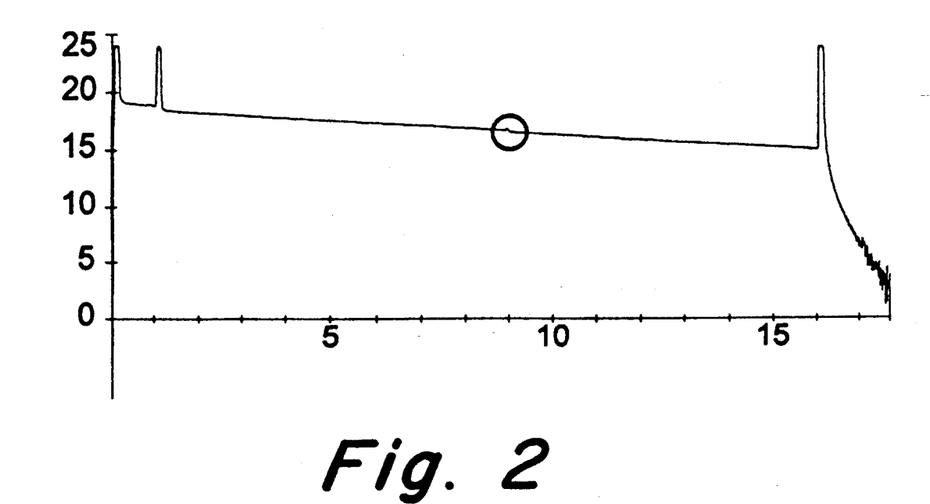
FIG. 2 shows an OTDR trace having an unexpected reflection shown by the circled portion of the trace.
Figure 3:
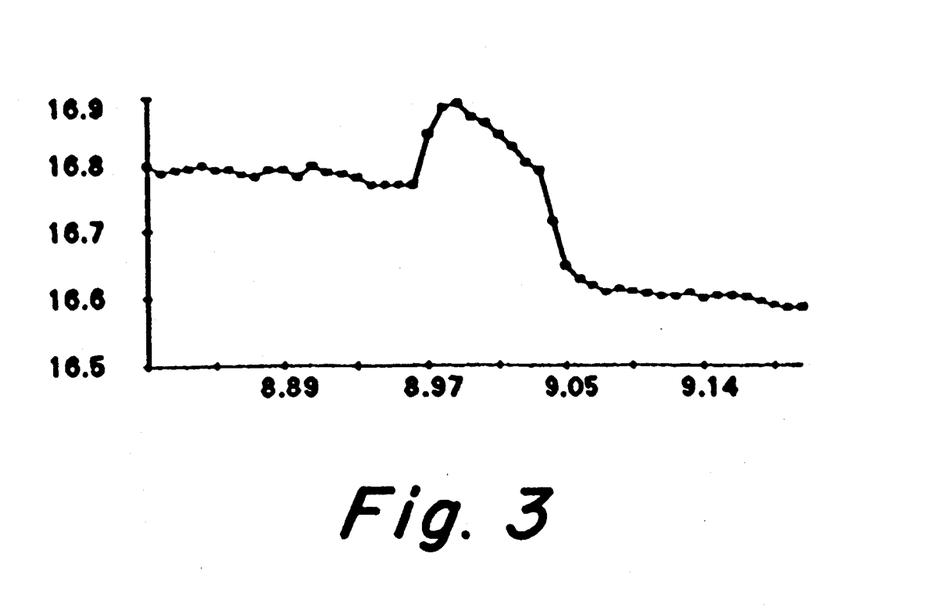
FIG. 3 is an expanded view of the circled portion of the trace of FIG. 2.

An example of such an unexpected reflection (hereinafter referred to simply as a "reflection") is shown by the circled portion of the OTDR trace of FIG. 2 and in expanded form in FIG. 3. The height of this reflection relative to the straight line slope of the trace is approximately 0.12 dB, i.e., it represents a very small increase in the power reflected back to the OTDR. In this case, a point defect is also present at the reflection location (note the drop in power level before and after the reflective event in FIG. 3).

As known in the art, the height of a reflection is normally reported as its "ORL" value to eliminate the effect of pulsewidth. Specifically, the relationship between reflection height, A, and ORL value is given by:

$$ORL = B - 10 * \text{LOG} \,[(10^{(A/5)} - 1) * PW]$$

where B is the fiber backscattering level and PW is the OTDR pulsewidth in ns.

In the past, a method known as the "slope technique" has been used to automatically detect reflections in OTDR traces. In accordance with this method, an error array (EA) was calculated by fitting the original trace data between fiber start (FS) and fiber end (FE) with a straight line using a least squares fitting routine and then subtracting that straight line from the original trace on a point-by-point basis. The resulting error array was then examined and an alarm triggered with a rising slope exceeding a predetermined threshold was found.

In practice, the threshold level had to be set high enough so that random noise events were not falsely labeled as reflections. Accordingly, reflections having a height less than about 0.06 dB above the background noise could not be reliably found with this method for long lengths of fiber. As discussed below, with the present invention, small reflections of this type are readily found and indeed, the method works successfully down to reflections having a height of only about 0.025 dB above the background noise, i.e., the sensitivity of the present invention is more than twice on a dB scale than that of the slope technique.

The use of filters to detect relatively weak signals in noise is known in the field of digital signal processing. See, for example, John Karl, *An Introduction to Digital Signal Processing*, Academic Press, 1989, pages 217–225. Correlation detectors and the whitening of noise is discussed in Harry L. Van Trees, *Detection, Estimation, and Modulation Theory*, Part I, John Wiley & Sons, 1968, pages 246–253 and 287–293. There has been, however, no disclosure or suggestion in the art to apply such procedures to the problem of fiber inspection by an OTDR. Moreover, there has been no disclosure or suggestion that such procedures would achieve the significant improvement in reflection detection reported herein.

SUMMARY OF THE INVENTION

In view of the foregoing, it is an object of the present invention to provide an improved method for detecting reflection-type discontinuities in optical waveguide fibers. More particularly, it is an object of the invention to provide an improved method for detecting such discontinuities by means of an OTDR.

To achieve the foregoing and other objects, the invention in accordance with certain of its aspects provides a method for detecting reflection-type discontinuities in an optical waveguide fiber comprising the steps of:

(a) applying a pulse of light to the optical waveguide fiber by means of an OTDR;

(b) detecting the light reflected back to the OTDR from the fiber and generating amplitude values at a set of data points corresponding to the detected reflected light; and (c) detecting reflection-type discontinuities by cross-correlating the amplitude values with a predetermined waveform (the "cross-correlation waveform") which is characteristic of a reflection-type discontinuity.

In certain preferred embodiments of the invention, the amplitude values are modified prior to step (c) in accordance with the noise expected to be contained in said values, i.e., in accordance with the noise spectrum characteristic of said amplitude values. In particular, the amplitude values are modified to at least partially compensate for the difference between the noise spectrum and white noise.

In certain cases, such modification can be achieved by backward differencing the amplitude values. In such cases, a predetermined waveform which has been backward differenced is also used.

In other preferred embodiments, a predetermined waveform is used which, by itself, at least partially compensates for the difference between the noise spectrum of the amplitude values and the noise spectrum of white noise. In particularly preferred embodiments of this type, the predetermined waveform is obtained by backward differencing a first waveform to produce a second waveform and forward differencing the second waveform to produce the predetermined waveform. The first waveform can be a rectangle, triangle, or trapezoid and most preferably is obtained by averaging OTDR traces from optical waveguide fibers known to contain reflection-type discontinuities.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIG. 7c shows the result of applying the compensating characteristic of FIG. 7b to the noise spectrum of FIG. 7a.

DESCRIPTION OF THE PREFERRED EMBODIMENTS

As discussed above, the present invention relates to methods for detecting reflection-type discontinuities in optical waveguide fibers by means of an OTDR.

The invention can be practiced using various commercially available OTDRs including those manufactured by Laser Precision Corporation (Utica, N.Y.), Anritsu Corp. (Tokyo, Japan) and Photon Kinetics, Inc. (Beaverton, Oreg.), among others. Such equipment produces a digital output, i.e., amplitude values at a set of data points, which can be directly inputted into a computer system, e.g., a 486 personal computer, for processing in accordance with the invention. Alternatively, the procedures of the invention can be performed internally as part of the OTDR's internal trace analysis process.

In its most basic embodiment, the invention comprises cross-correlating the OTDR trace with a waveform, the "cross-correlation waveform", which is characteristic of a typical unexpected, reflection-type discontinuity. Preferably, the cross-correlation is performed on the OTDR trace after the straight line component of the trace corresponding to the fiber's attenuation has been removed on a point-by-point basis. This removal can be performed using a least squares fitting routine as in the prior slope technique so as to generate an error array (EA) representing the difference between the calculated straight line and the amplitude values of the original trace.

The cross-correlation waveform is preferably obtained by averaging together actual OTDR traces from fibers having known unexpected reflections of various amplitudes, e.g., amplitudes ranging from about 0.05 dB to about 0.25 dB relative to the straight line component of the OTDR trace. The traces should be obtained under conditions comparable to those which will be used in the practice of the invention, including, in particular, the pulsewidth of the laser light and the raw data averaging time used to generate the OTDR trace.

The averaging of the OTDR traces can be done using, for example, a spreadsheet program for a personal computer. Preferably, most of the trace information is removed, leaving only the reflection and the region immediately surrounding it. The reflections are aligned in the spreadsheet so that one reflection trace is contained in each column and the reflection starting points are in the same row. The reflections are then averaged together, and an average reflection shape generated in a new column of the spreadsheet.

Figure 4:
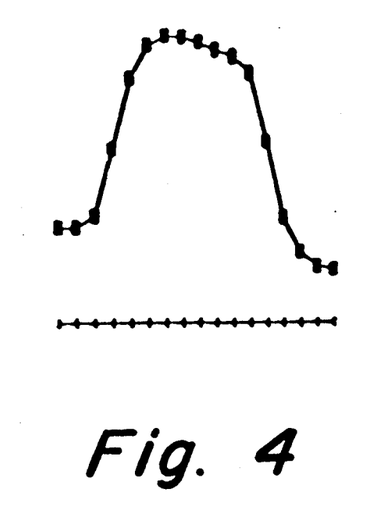
FIG. 4 shows a cross-correlation waveform for use in detecting unexpected, reflection-type discontinuities in accordance with the invention.

A typical average reflection shape (cross-correlation waveform) is shown in FIG. 4. As shown therein, by averaging across many reflections, ten in this case, much of the OTDR noise has been eliminated and any peculiarity of one reflection does not significantly affect the final shape.

The cross-correlation with the error array (EA) of the OTDR trace is performed as follows:

```
for i = FS, (FE - (M - 1))
    for j = 0, M - 1
        OUTPUT[i] = OUTPUT[i] + EA[i + j] * W[j]
    end loop
``` where M is the number of data points used to define the cross-correlation waveform, e.g., 17 points in FIG. 4, and W[] is an array of waveform amplitudes (coefficients) obtained from the average reflection shape, e.g., from FIG. 4. The inner loop determines the output for one data point. Each waveform coefficient W[] is multiplied by one trace data point EA[]. These results are summed and assigned to the current point in the OUTPUT array. The outer loop cycles through the entire trace, performing the operation on each data point, from fiber start (FS) to the end of the fiber less the waveform width (FE−(M−1)).

Figure 5:
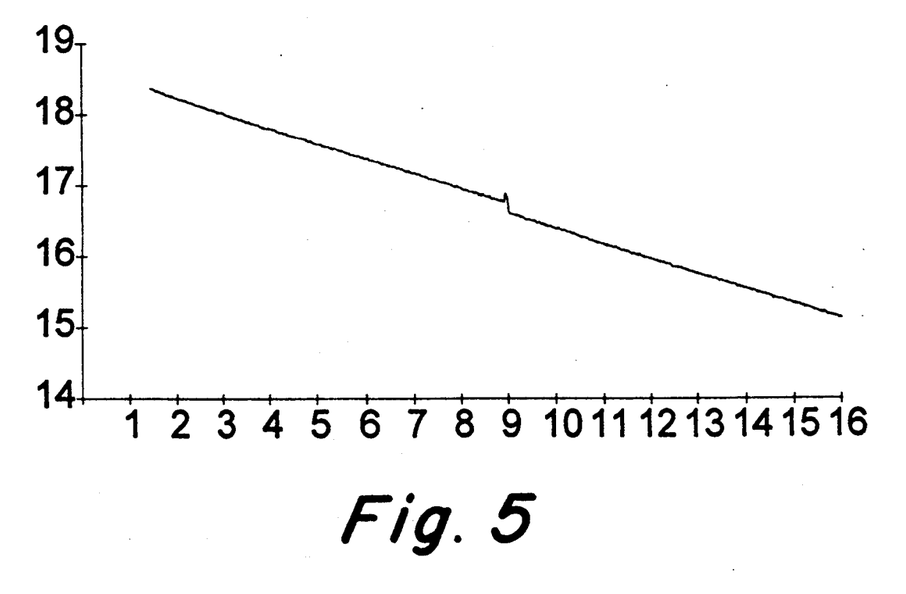
FIG. 5 shows a portion of an OTDR trace which includes a reflection-type discontinuity.
Figure 6:
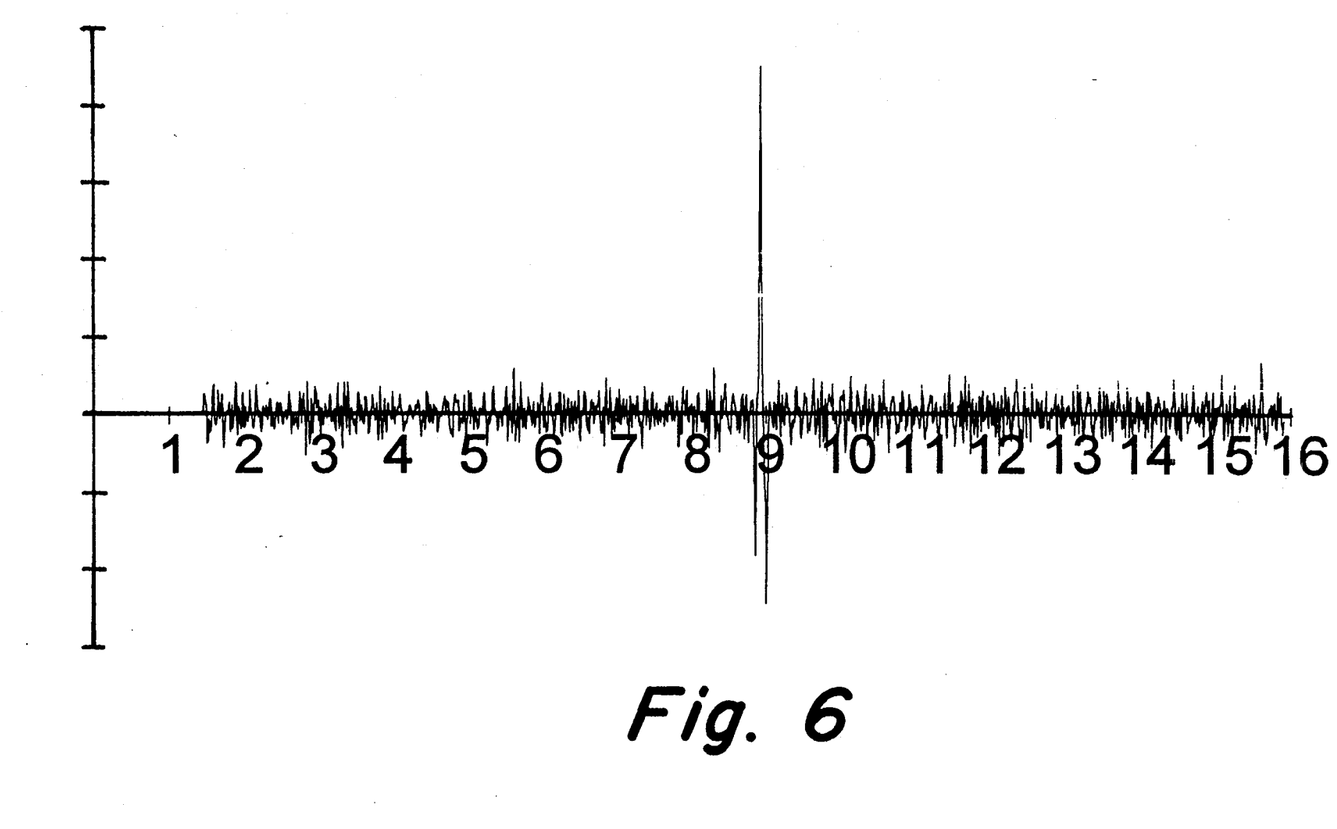
FIG. 6 shows the result of cross-correlating the waveform of FIG. 4 with the error array for the discontinuity of FIG. 5.

The application of this procedure to the OTDR trace of FIG. 5 is shown in FIG. 6. The peak in FIG. 6 is plainly significantly easier to detect than the original reflection in FIG. 5.

Figure 7A:
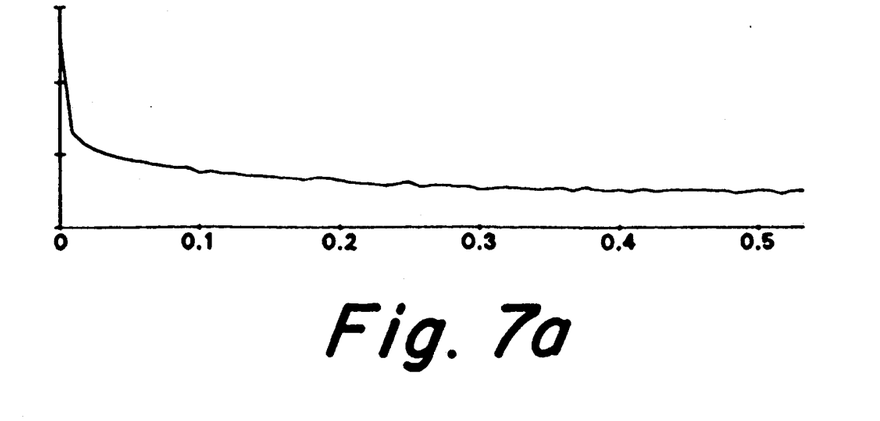
FIG. 7a shows a power spectrum of typical OTDR noise.

The foregoing cross-correlation procedure works best when the noise in the signal is white or broadband noise. Unfortunately, OTDR noise has some frequency dependence as shown in FIG. 7a. As can be seen in this figure, the magnitude of the noise is relatively higher at lower frequencies and decreases at higher frequencies. Notwithstanding this deviation from optimum, the basic cross-correlation technique represents a significant improvement over prior techniques for detecting reflections.

Figure 7B:
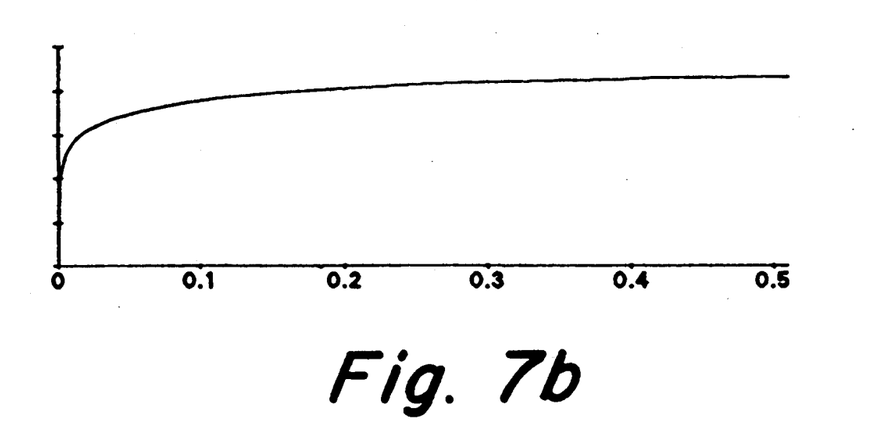
FIG. 7b shows a compensating frequency characteristic for making the OTDR noise more broadbanded.

Even further improved detection can be achieved by pre-conditioning the OTDR trace so that its noise is closer to white noise. For example, if the noise spectrum of FIG. 7a were compensated by the spectrum of FIG. 7b, the combined frequency plot would be the flattened, more broadband noise of FIG. 7c. In accordance with the invention, this compensation can be achieved by the simple operation of performing a backward difference on the error array as follows:

$$\text{for } i = (FS + 1), FE \quad (2)$$
$$EA'[i] = EA[i] - EA[i - 1]$$
$$\text{end loop}$$

Figure 7C:
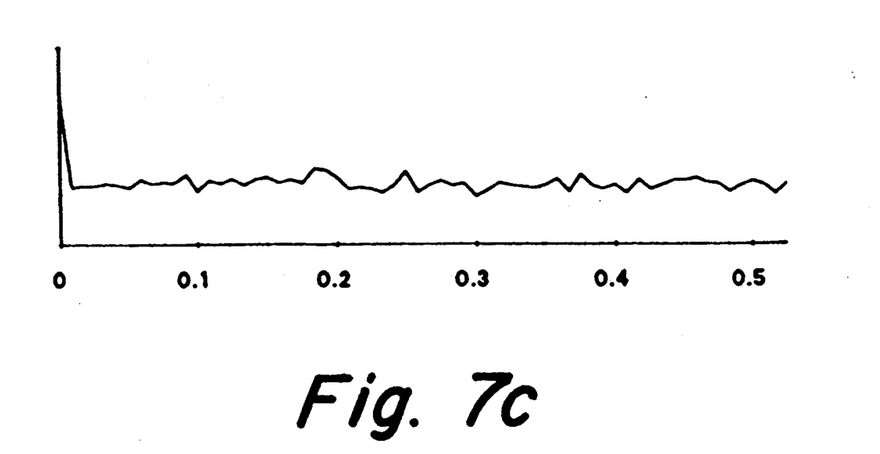

The performance of this operation results in the frequency noise characteristics of FIG. 7c. Since the trace data is subtracted in equation 2, the same operation must also be applied to the cross-correlation waveform since that waveform must "match" the reflection which has now been modified by equation 2. The waveform modification can be performed by:

$$\text{for } i = 1, M - 1$$
$$W'[i] = W[i] - W[i - 1]$$
$$\text{end loop}$$

Figure 8A:
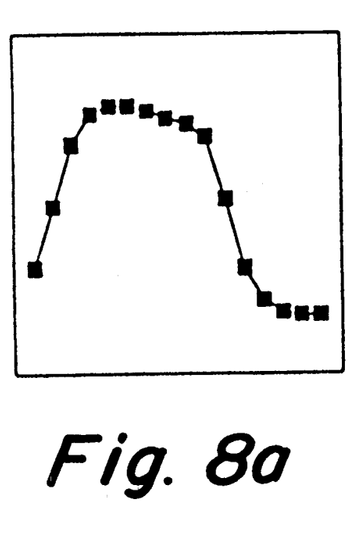
FIG. 8a shows the cross-correlation waveform of FIG. 4.
Figure 8B:
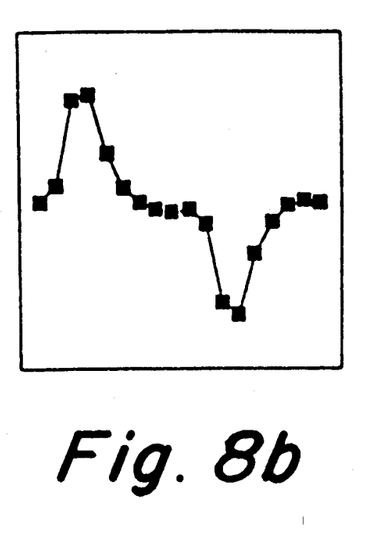
FIG. 8b shows a backward difference of that waveform.

This new waveform shape is shown in FIG. 8b. If desired, this shape could be cross-correlated with the new trace EA′ to detect reflections. This approach, however, would introduce an additional calculation every time a trace was examined. Namely, the original trace could not be used; rather, the loop in equation 2 would have to be executed before the cross-correlation step.

Figure 8C:
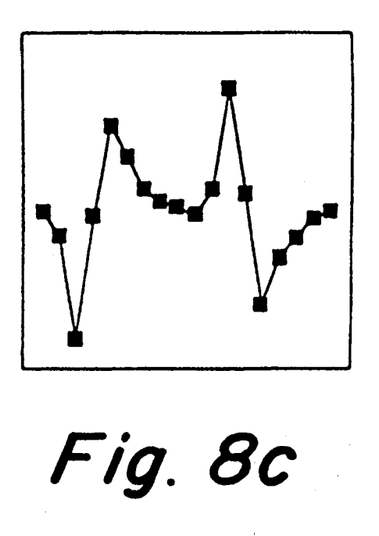
FIG. 8c shows a forward difference of the waveform of FIG. 8b.

In accordance with the invention, this extra step is avoided by modifying the cross-correlation waveform to compensate for the noise characteristics of the OTDR trace. Instead of performing the subtraction operation on both the trace and the waveform, the waveform coefficients in FIG. 8b are forward-differenced to generate the shape depicted in FIG. 8c. This twice-differenced reflection shape is used in the cross-correlation operation of equation 1 directly on the unmodified error array, thus avoiding the need for the extra differencing step on that array.

In accordance with the equations set forth above, this forward differencing is performed as follows:

$$\text{for } i = 0, M - 2$$
$$W''[i] = W'[i + 1] - W'[i]$$
$$\text{end loop}$$

The resulting W″[] values are used in the cross-correlation operation of equation 1 in place of the W[] values.

It should be noted that the power spectrum shown in FIG. 7a is for a Laser Precision TD-2000 OTDR with a TD-295 laser module operating at a medium pulsewidth of 72 meters. Noise characteristics may differ for other instruments operating under different conditions. For another OTDR, the noise frequency characteristic of a uniform fiber trace with no defects or reflections should be determined and compared with that of FIG. 7a. Based on that comparison, a noise whitening operation other than backward-differencing may be required, e.g., a digital filtering operation more complex than backward-differencing. Depending upon the operation selected, the two-step procedure of FIG. 8 may or may not be applicable, e.g., the procedure may not be applicable if the digital filtering operation is non-linear. If not applicable, separate operations on the OTDR trace and the cross-correlation waveform are performed.

As indicated above in equation 1, the cross-correlation is done on the error array and the result is assigned to the OUTPUT array. Reflection-type discontinuities are located by moving from left to right through the OUTPUT array and testing the elements of the array against a threshold. The location of discontinuities can be determined using this procedure as follows.

The first point that exceeds the threshold is labeled POINT A and the point just before the point which drops below the threshold is labeled POINT B. The maximum value in the OUTPUT array between POINT A and POINT B indicates the position where the cross-correlation has its maximum value and is denoted FMAX.

Once FMAX is determined, the rest of the reflection location routine can be performed on the original trace array, OTA[]. The reflection PEAK is found by searching forward between FMAX-PW and FMAX+PW for a maximum in the original trace, where PW is the pulsewidth used to produce the OTDR trace.

For the purposes of quantifying the magnitude of the reflection, the reflection start (RS) and the reflection end (RE) can be found. In particular, RS can be found by starting at PEAK and stepping backwards from PEAK to (PEAK−2 PW). The minimum point within this region is RS.

RE can be found by starting at PEAK and stepping forward until the value of the array is less than or equal to the value at RS. This ensures that the bulk of the reflection is passed. Stepping forward is then continued until a point is found that is lower in dB than the following point. That point is then defined as RE. In this way, it is assured that RE is located beyond any loss associated with the reflection. If these conditions are not met by the time the point PEAK+2PW is reached, then RE is set equal to PEAK+2PW.

Figure 9:
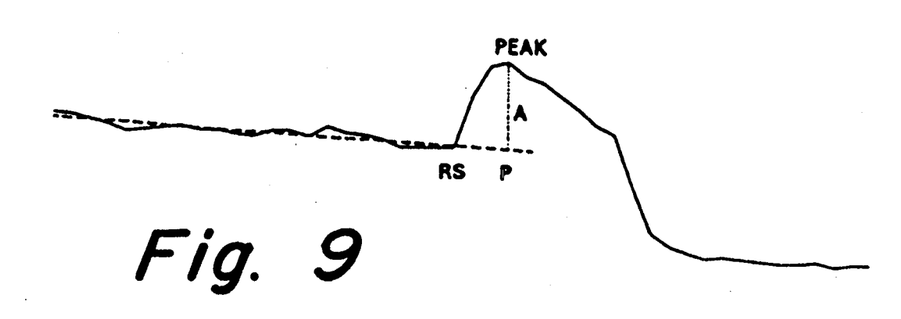
FIG. 9 shows a procedure for determining the height of an unexpected reflection detected in accordance with the invention.

Once the points PEAK, RS, and RE are identified, the magnitude of the reflection can be quantified as illustrated in FIG. 9. To do so, a least squares approximation slope and intercept, M and B, are found for the line segment between (RS−10 PW) and RS. In the event that the reflection being quantified is within 10 PW of the fiber start, a point defect, or another reflection, the line segment begins at the fiber start, the end of the point defect, or the end of the prior reflection, as the case may be.

To predict the backscatter level if the reflection were not present, the value P of the least squares line at PEAK is found:

$$P = M*PEAK + B$$

The reflection height is then the difference between the value of original trace array at PEAK and the extrapolated backscatter level:

$$A = OTA[PEAK] - P$$

If a reflection is within 1 PW of the fiber start, a point defect, or another reflection, a least squares line cannot be calculated reliably. In such a case, a P value is not calculated and instead the magnitude of the reflection is calculated as:

$$A = OTA[PEAK] - OTA[RS]$$

EXAMPLE 1

Comparison of Cross-Correlation Technique With Slope Technique

A comparison was made between the reflection detection technique of the present invention and the prior slope technique.

OTDR traces with known reflections were tested using both techniques. Each technique was optimized to minimize false alarms while maximizing the number of real reflections identified.

With no false alarms in either case, the present invention was at least 3–4 dB more sensitive. That is, the invention could resolve reflections that were 3–4 dB smaller in ORL than the smallest reflection that the slope technique could identify.

In addition to this finding, the technique of the invention was found to be less sensitive to noise at the far end of the OTDR trace. As a result, the technique can be used to detect reflections on longer fibers without generating high levels of false alarms.

EXAMPLE 2

Cross-Correlation Waveforms

Experiments were performed using cross-correlation waveforms other than the waveform obtained by averaging OTDR traces having known reflections. In particular, twice-differenced rectangles, triangles, and trapezoids were used.

These experiments showed that the exact shape of the waveform is not as important as its width. In particular, the twice-differenced rectangle, triangle, or trapezoid was found to work almost as well as the shape of FIG. 8c as long as the full width at half maximum (FWHM) remained relatively constant. Performance was found to degrade rapidly if the width differed by more than about 15%.

Although preferred and other embodiments of the invention have been described herein, other embodiments may be perceived by those skilled in the art without departing from the scope of the invention as defined by the following claims.

What is claimed is:

1. A method for detecting a reflection-type discontinuity in an optical waveguide fiber comprising the steps of:
    (a) applying a pulse of light to the optical waveguide fiber by means of an optical time domain reflectometer (OTDR);
    (b) detecting the light reflected back to the OTDR from the fiber and generating amplitude values at a set of data points corresponding to the detected reflected light; and
    (c) detecting reflection-type discontinuities by cross-correlating the amplitude values with a predetermined waveform which is characteristic of a reflection-type discontinuity.

2. The method of claim 1 wherein a straight line is fitted to the amplitude values and subtracted therefrom on a point-by-point basis prior to step (c).

3. The method of claim 1 wherein the predetermined waveform is obtained by averaging OTDR traces obtained from optical waveguide fibers containing reflection-type discontinuities.

4. The method of claim 3 wherein straight lines are fitted to the OTDR traces and subtracted therefrom prior to averaging.

5. The method of claim 1 wherein the amplitude values are modified prior to step (c) in accordance with a predetermined noise spectrum for said values.

6. The method of claim 5 wherein the predetermined noise spectrum differs from white noise and the modification at least partially compensates for said difference.

7. The method of claim 5 wherein the amplitude values are modified by performing a backward difference.

8. The method of claim 5 wherein the predetermined waveform is obtained by averaging OTDR traces obtained from optical waveguide fibers containing reflection-type discontinuities and then backward differencing said average.

9. The method of claim 8 wherein straight lines are fitted to the OTDR traces and subtracted therefrom prior to said averaging and backward differencing.

10. The method of claim 1 wherein the noise spectrum for said amplitude values differs from white noise and the predetermined waveform at least partially compensates for said difference.

11. The method of claim 1 wherein the predetermined waveform is obtained by backward differencing a first waveform to produce a second waveform and forward differencing the second waveform to produce the predetermined waveform.

12. The method of claim 11 wherein the first waveform is selected from the group consisting of rectangles, triangles, and trapezoids.

13. The method of claim 12 wherein the full width at half maximum of the first waveform is approximately equal to the full width at half maximum of a waveform for a reflection-type discontinuity obtained by averaging OTDR traces obtained from optical waveguide fibers containing reflection-type discontinuities.

14. The method of claim 13 wherein straight lines are fitted to the OTDR traces and subtracted therefrom prior to said averaging.

15. The method of claim 11 wherein the first waveform is obtained by averaging OTDR traces obtained from optical waveguide fibers containing reflection-type discontinuities.

16. The method of claim 15 wherein straight lines are fitted to the OTDR traces and subtracted therefrom prior to said averaging.

17. A method for detecting a reflection-type discontinuity in an optical waveguide fiber comprising the steps of:
   (a) applying a pulse of light to the optical waveguide fiber by means of an optical time domain reflectometer (OTDR);
   (b) detecting the light reflected back to the OTDR from the fiber and generating amplitude values at a set of data points corresponding to the detected reflected light; and
   (c) detecting reflection-type discontinuities by cross-correlating the amplitude values with a predetermined waveform obtained by:
      (i) averaging OTDR traces obtained from optical waveguide fibers containing reflection-type discontinuities to produce a first waveform;
      (ii) backward differencing the first waveform to produce a second waveform; and
      (iii) forward differencing the second waveform to produce the predetermined waveform.

18. The method of claim 17 wherein a straight line is fitted to the amplitude values and subtracted therefrom on a point-by-point basis prior to step (c) and wherein straight lines are fitted to the OTDR traces and subtracted therefrom prior to said averaging of step (c)(i).

* * * * *